United States Patent
Jia et al.

(10) Patent No.: US 9,658,052 B2
(45) Date of Patent: May 23, 2017

(54) METHOD FOR REDUCING INTERFERENCE FROM SCATTERED LIGHT/REFLECTED LIGHT OF INTERFERENCE PATH BY GENERATING CARRIER THROUGH PHASE

(71) Applicant: FUDAN UNIVERSITY, Shanghai (CN)

(72) Inventors: Bo Jia, Shanghai (CN); Qian Xiao, Shanghai (CN); Yuan Wu, Shanghai (CN); Pang Bian, Shanghai (CN)

(73) Assignee: Fudan University, Shanghai (CN)

( * ) Notice: Subject to any disclaimer, the term of this patent is extended or adjusted under 35 U.S.C. 154(b) by 0 days.

(21) Appl. No.: 14/764,489

(22) PCT Filed: Jan. 27, 2014

(86) PCT No.: PCT/CN2014/071571
§ 371 (c)(1),
(2) Date: Jul. 29, 2015

(87) PCT Pub. No.: WO2014/117715
PCT Pub. Date: Aug. 7, 2014

(65) Prior Publication Data
US 2015/0377603 A1 Dec. 31, 2015

(30) Foreign Application Priority Data
Jan. 29, 2013 (CN) .......................... 2013 1 0034085

(51) Int. Cl.
*G02F 1/01* (2006.01)
*G02F 1/035* (2006.01)
(Continued)

(52) U.S. Cl.
CPC ..... *G01B 9/02056* (2013.01); *G01B 9/02059* (2013.01); *G01D 5/35306* (2013.01); *G02F 1/0115* (2013.01)

(58) Field of Classification Search
CPC . G02F 1/2255; G02F 1/0115; G01B 9/02056; G01B 9/02057; G01B 9/02059;
(Continued)

(56) References Cited

U.S. PATENT DOCUMENTS

| | | | | |
|---|---|---|---|---|
| 5,949,546 A | * | 9/1999 | Lee | G01B 11/14 356/492 |
| 6,201,234 B1 | * | 3/2001 | Chow | H04B 10/032 250/214 A |
| 2012/0136238 A1 | * | 5/2012 | Milner | A61B 5/0066 600/411 |

* cited by examiner

*Primary Examiner* — Kaveh C Kianni
*Assistant Examiner* — Hung Lam
(74) *Attorney, Agent, or Firm* — Hamre, Schumann, Mueller & Larson, P.C.

(57) ABSTRACT

A method for reducing interference from scattered light/ reflected light of an interference path by generating carrier through phase. Phase modulation is applied on the terminal of a fiber path, and a target signal is separated from an interference signal by selecting a specific working point, to obtain a purer target signal, thereby lengthening the measurement distance. The signal demodulation manner used in this method is different from the traditional manner of modulation performed by generating a carrier through the phase, and does not need to use the modulation frequency as the reference signal during demodulation, so this manner is easily implemented. The method is applicable to long-distance pipeline monitoring and wide-range fiber perimeter security, and especially to an application environment in which the modulation end is far away from the signal demodulation end. The method can also be applied in an application in which measurement is implemented by modulating an optical transmission phase in a feedback device.

10 Claims, 5 Drawing Sheets

(51) Int. Cl.
*G02F 1/295* (2006.01)
*G01B 9/02* (2006.01)
*G01D 5/353* (2006.01)

(58) Field of Classification Search
CPC ........... G01D 5/35306; G01D 5/35309; G01D 5/3537
USPC ....... 385/1–4, 8, 140; 250/214 LS, 263, 550, 250/551, 574
See application file for complete search history.

METHOD FOR REDUCING INTERFERENCE FROM SCATTERED LIGHT/REFLECTED LIGHT OF INTERFERENCE PATH BY GENERATING CARRIER THROUGH PHASE

TECHNICAL FIELD

The present invention belongs to the field of optical fiber sensing technology, in particular eliminate the impact of backscattered light in an optical fiber sensor.

BACKGROUND

Optical fiber sensing technology is often used in large-scale, long-distance monitoring, such as security monitoring used in oil pipelines, high-voltage power grids, pipelines, communications cable and other infrastructure, which the fiber used to be the sensor, real-timely acquiring related disturbance signal, determine the location of the disturbance occurred by the analysis characterize. The structure of single core feedback optical path is: using a single fiber as sensing fiber, the fiber itself is not closed, only apply a feedback device at the end of the fiber, such as a mirror constituting interference optical path. In practice, this structure laying is flexible. The characteristics of such monitoring systems is: light carrying the disturbance information transmitted to the end of the fiber, then reflect by feedback device.

The following is a positioning technology of single core feedback positioning system.

As shown in FIG. 1, we use a sensing section for the optical fiber (optical cable). 1 is the start point of the optical fiber (optical cable), and 2 is a feedback device at the end of the sensing section, such as a mirror. The incident light retrace through the feedback device. Suppose there is a disturbance at point D outside, modulation of light phase is φ(t), when the light twice perturbed points D, phase modulation is subject to:

$$\phi_1(t) = \phi(t) + \phi(t-T)$$

wherein, $T = 2n_{eff}L/c$, L is the distance between disturbance point D and feedback device 2, c is the speed of light in vacuum, $n_{eff}$ is the effective refractive index of the optical fiber.

As shown in FIG. 2, we configure an interference optical path.

Interference optical path include the following parts: N*M (N, M are integers) coupler 3, P*Q (P, Q are integers) coupler 4, optical fiber delayer 5 (delay τ), an optical fiber (optical cable) 6, and feedback device 2. 3a1, 3a2, ..., 3aN, 3b1, 3b2 are ports of coupler 3, 3a1, 3a2, ..., 3aN are co-rotating ports with a total of N, 3b1, 3b2 are two ports in another group co-rotating ports (with a total of M) of coupler 3. 4a1, 4a2, 4b1 are ports of coupler 4, 4a1, 4a2 are two ports in a group co-rotating ports (with a total of P) of coupler 4, 4b1 are two ports in another group co-rotating ports (with a total of Q) of coupler 4. Optical fiber 6 is induction optical fiber. Feedback device 2 make the light transmitted along the fiber go back to the fiber 6 and return to the coupler 4. Light source input through the port 3a1 of coupler 3, after splitting in coupler 3, output respectively through the port 3b1, 3b2, two optical paths is:

I: 3b1→5→4a1→4b1→6→2→6→4b1→4a2→3b2
II: 3b2→4a2→4b1→6→2→6→4b1→4a1→5→3b1

The two optical paths join at coupler 3 again and generate interference, interference signals output respectively through port 3a1, 3a2, ..., 3aN.

In the interference optical path, the light firstly enter delayer 5 and then enter fiber cable 6, the phase modulation applied to the light is:

$$\phi_2(t) = \phi(t-\tau) + \phi(t-\tau-T)$$

Phase difference between two coherent interference lights is:

$$\Delta\phi = [\phi(t) + \phi(t-T)] - [\phi(t-\tau) + \phi(t-\tau-T)]$$

In the spectrum of phase difference, there is a frequency drop point, or "notch point", and we can determine the location of the disturbance arising according to the notch point. "Notch point" is shown in FIG. 3, in this amplitude—frequency diagram obtained by time frequency transform, the "O" mark the notch point. The relationship between notch point and disturbance position is:

$$f_{null}(k) = \frac{k}{2} \cdot \frac{c}{2n_{eff}L}, (k = 2n-1, n \in N)$$

wherein, $f_{null}(k)$ is frequency of k-order notch point.

We can see from the above principle, the coherent light must transmit from the endpoint 1 of sensing optical fiber 6 to endpoint 2 and then return to sensing optical fiber 6, in order to carry the position "L" message. However, in practice, due to the structural characteristics of the optical fiber and the fiber itself defects and other reasons, there is a scattered light in optical fibers, such as Rayleigh scattering light and the like.

As shown in FIG. 4, 7 is a scatter point, backscattered light along the optical cable go back to interference structure, and therefore there is two beams:

I: 3b1→5→4a1→4b1→6→7→6→4b1→4a2→3b2
II: 3b2→4a2→4b1→6→7→6→4b1→4a1→5→3b1

Because of similar spectral characteristics, the optical path are equal without disturbance, and therefore join at the coupler 3 again will also occur interference. Obviously, the information carried by the two beam of interference light is the length $L_7$ between point 7 and disturbance point D. 8 is another scattering point, the length information carried by the interference formed by backscatter is the length $L_8$ between point 8 and disturbance point D, apparently, $L_7 \neq L_8 \neq L$, since these interference is mixed at the output, the interference light generated by Brillouin backscattered light or Raman backscattered light can be filter out by optical filter, but for the interference light generated by Rayleigh scattering light, or the interference light generated by contact point of optical path, it is impossible to eliminate by optical filtering method, will affect the purity of useful interference signal, and will directly affect the accuracy of the disturbance L position. Generally, the intensity of interference generated by backscattered light, contact reflected is significantly less than the intensity of interference generated by reflected light (effective interference signal), and will not have a significant impact on the effective interference signal, accuracy of L can meet the actual needs. But after the monitoring circuit reach a certain length, scattered light affects the entire line obviously, then we can observe the obvious interference signal distortion has occurred, the system can not obtain a valid interference signal normally.

Similarly, reflection by the contact point of optical path can also cause the same adverse effects on the interference signal.

The impact of scatter (reflect) light in the conventional path is not only the obvious restriction in monitoring system.

When a large scatter (reflect) point exists, the system can not be properly tested in the line.

In order to cut the impact of the signal, the invention 201010508357.2 (FIG. 5) is proposed by use phase generated carrier technology to separate effective interference phase information from optical output mixed with backscattered light, contact point reflected light interference signal to obtain pure signal having effective disturbance position information, so as to eliminate the impact of back scattered light and the like purposes. In the technology, at the end of sensing optical fiber (optical cable) 6, access a phase modulator 9 close to the feedback device 2, apply modulation signal to phase modulator 9 to obtain carrier fundamental frequency (or double frequency) sideband signal only contains useful information is extracted, and the use of PGC demodulation side information extracted. PGC demodulation techniques generally use coherent demodulation technique in which demodulation process requires the use of homologous signal modulation signal as a reference signal. Due to the need to obtain a modulated signal at signal generation side, in the application of single feedback system, when the end with a signal modulation (position of 9) away from the signal generation side, how to obtain a reference signal, the method becomes difficulty to achieve.

SUMMARY OF THE INVENTION

The purpose of the present invention is to provide a method to eliminate the impact of backscattered light in optical fiber sensor.

The present invention provides a method, use phase modulation technique to separate the target signal from the interfering signals formed by scattering/reflecting in optical fiber path by a simple high-pass filtering, to obtain pure signal having effective disturbance position signal. The setting of phase-modulated signal's amplitude make sidebands of 0 frequency do not contain a valid form of components, only contains interference signal by backscatter, but the fundamental and harmonic frequency modulation sidebands do not include interference signal. On this basis, using a high-pass filter can eliminate the disturbing signal of stray light. Compared with the traditional PGC demodulation, demodulation without using phase modulation signal applied at the signal as a reference signal homologous, structure of this method is simple and easier to implement. Specific methods are as follows.

Connection in optical path is shown in FIG. 5. To be able to distinguish between the two interference signals, the analysis of selecting the modulation signal operating point is as follows.

Phase modulator introduce the interferometer phase difference $\Delta\phi_c(t)$, after reaching feedback means 2 through the phase modulator, the light reflect to the optical cable and occurs interference signal, the signal is expressed as:

$$P = p_1 \cos[\phi_0 + \Delta\phi_1(t) + \Delta\phi_c(t)] \tag{1}$$

wherein, $p_1$ is a constant coefficient related to the system parameters, $\phi_0$ is an initial phase of the interference structures and a constant, $\Delta\phi_1(t)$ is an interference phase difference caused by disturbance;

As to the back scattered light caused by previous path in the phase modulator 9 in optical fable, do not through phase modulator as shown in FIG. 5, changes in the phase are not affected by the signal applied to the phase modulator, part of the optical interference signal is expressed as:

$$P_B = \sum_i p_{Bi} \cos(\phi_{B0i} + \Delta\phi_{B1i}(t)) \tag{2}$$

wherein, $p_{Bi}$ is an interference coefficient caused by the i-th scattering point of the optical fiber, $\phi_{B\,0\,i}$ is an initial phase corresponding to the i-th scattering point, $\Delta\phi_{B1i}(t)$ is an interference phase difference corresponding to the i-th scattering point and caused by disturbance, $$\sum_i$$

represented the sum of all the scattered points along the previous induction fiber of phase modulator 9.

The total output signal change portion indicates as follows:

$$P_{alt} = P + P_B \tag{3}$$

sinusoidal signal applied to the phase modulator 9 have frequency $f_m$, sinusoidal carrier signal $\Delta\phi_c(t)$ generated by the optical path can be expressed as:

$$\Delta\phi_c(t) = \phi_m \cos(2\pi f_m t) \tag{4}$$

$\phi_m$ is the amplitude of $\Delta\phi_c(t)$.

$J_n$ order Bessel function expansion of Formula (1) is expressed as:

$$\begin{aligned}P &= p_1\cos[\phi_0 + \Delta\phi_1(t) + \phi_m\cos(2\pi f_m t)] \\ &= p_1\cos(\phi_0 + \Delta\phi_1(t))[J_0(\phi_m) + 2J_2(\phi_m)\cos(4\pi f_m t) + \ldots] + \\ &\quad p_1\sin(\phi_0 + \Delta\phi_1(t))[2J_1(\phi_m)\cos(2\pi f_m t) + 2J_3(\phi_m)\cos(6\pi f_m t) + \ldots]\end{aligned} \tag{5}$$

and $$\begin{aligned}P_{alt} &= P + P_B \\ &= P_B + p_1\cos(\phi_0 + \Delta\phi_1(t))[J_0(\phi_m) + 2J_2(\phi_m)\cos(4\pi f_m t) + \ldots] + \\ &\quad p_1\sin(\phi_0 + \Delta\phi_1(t))[2J_1(\phi_m)\cos(2\pi f_m t) + 2J_3(\phi_m)\cos(6\pi f_m t) + \ldots] \\ &= [P_B + p_1\cos(\phi_0 + \Delta\phi_1(t)) \cdot J_0(\phi_m)] + \\ &\quad p_1\cos(\phi_0 + \Delta\phi_1(t))[2J_2(\phi_m)\cos(4\pi f_m t) + \ldots] \\ &\quad p_1\sin(\phi_0 + \Delta\phi_1(t))[2J_1(\phi_m)\cos(2\pi f_m t) + 2J_3(\phi_m)\cos(6\pi f_m t) + \ldots]\end{aligned} \tag{6}$$

Adjusting the amplitude of the sinusoidal signal, so that:

$$J_0(\phi_m) = 0 \tag{7}$$

$$\begin{aligned}P_{alt} = P + P_B = P_B + &p_1\cos(\phi_0 + \Delta\phi_1(t))[2J_2(\phi_m)\cos(4\pi f_m t) + \ldots] + p_1\sin(\phi_0 + \Delta\phi_1(t))[2J_1(\phi_m)\cos(2\pi f_m t) + 2J_3(\phi_m)\cos(6\pi f_m t) + \ldots]\end{aligned} \tag{8}$$

At this time, $$\begin{aligned}P &= 0 + p_1\cos(\phi_0 + \Delta\phi_1(t))[2J_2(\phi_m)\cos(4\pi f_m t) + \ldots] + \\ &\quad p_1\sin(\phi_0 + \Delta\phi_1(t))[2J_1(\phi_m)\cos(2\pi f_m t) + 2J_3(\phi_m)\cos(6\pi f_m t) + \ldots] \\ &= p_1\cos[\phi_0 + \Delta\phi_1(t) + \phi_m\cos(2\pi f_m t)]\end{aligned} \tag{9}$$

Each component in (9), without regard to amplitude variations, only consider the frequency distribution, $2p_1 J_N(\phi_m)\cos(\phi_{01}+\Delta\phi_1(t))\cos(2N\pi f_m t)$ (N=1, 3, 5, . . . ) is move frequency spectrum of $2p_1J_N(\phi_m)\cos(\phi_{01}+\Delta\phi_1(t))$ from 0 frequency to $Nf_m$; $2p_1J_M(\phi_m)\sin(\phi_{01}+\Delta\phi_1(t))\cos(2M\pi f_m t)$ (M=2, 4, 6, ...) is move frequency spectrum of $2p_1J_N(\phi_{m2})\sin(\phi_{01}+\Delta\phi_1(t))$ from 0 frequency to $Mf_m$. The frequency component of $P_B$ is near 0 frequency. Suppose $f_{s1max}$ is the max frequency of $\sin(\phi_{01}+\Delta\phi_1(t))$ (or $\cos(\phi_{01}+\Delta\phi_1(t))$), $f_{sBmax}$ is the max frequency of $P_B$, then $f_m$ can be:

$$f_m > f_{sBmax} + f_{s1max} \quad (10)$$

that is, $f_m$ is large enough to make the spectral of $P_B$ and P do not overlap, then use the high-pass filter to filter out $P_B$ to get a complete signal P with no interference. This may separate interference signal caused by scattering point from the reflected light formed by arriving the feedback device. After obtaining signal P, further use phase reconstruct method commonly used in interference structure, the restore signal can be obtained:

$$\Delta\phi(t) = \Delta\phi_1(t) + \phi_m \cos(2\pi f_m t) \quad (11)$$

It can be seen that while satisfying the formula (8) and $f_m$ is located out of the frequency component of $\Delta\phi_1(t)$, use the filtering technology to filter out frequency components of $f_m$, then obtain $\Delta\phi_1(t)$ to demodulate the signal.

The interference structure has two interference output ports, the interference signals of the two ports are expressed as:

$$P_{3a2} = p_1\cos[\phi_{11} + \Delta\phi_1(t) + \Delta\phi_c(t)] + \sum_i p_{Bi}\cos[\phi_{3a2-B0i} + \Delta\phi_{B1i}(t)] \quad (12)$$

$$P_{3a3} = p_1\cos[\phi_{12} + \Delta\phi_1(t) + \Delta\phi_c(t)] + \sum_i p_{Bi}\cos[\phi_{3a3-B0i} + \Delta\phi_{B1i}(t)] \quad (13)$$

$\phi_{11}$ and $\phi_{12}$ are an initial phase corresponding to the interference output of the two ports, and $\phi_{11} - \phi_{12} \neq n\pi$, n; is an integer.

According to the method previously described in the present invention, we can be obtained two signals with a fixed phase difference:

$$P_{3a2} = p_1 \cos[\phi_{11} + \Delta\phi_1(t) + \phi_m \cos(2\pi f_m t)] \quad (14)$$

$$P_{3a3} = p_1 \cos[\phi_{12} + \Delta\phi_1(t) + \phi_m \cos(2\pi f_m t)] \quad (15)$$

According to formula (14) and formula (15), signal $\Delta\phi(t)$ can be restored, and use the filtering technology to filter out frequency components of $f_m$, then obtain signal $\Delta\phi_1(t)$.

According to the above description, the specific steps of the inventive method are summarized as follows:

1) concatenating phase modulator 9 in the tail of a single core feedback sensing fiber;

2) Selecting signal frequency $f_m$ loaded in phase modulator 9, $f_m$ satisfy the following conditions:
$f_m > f_{sBmax} + f_{s1max}$, and $f_m$ is located out of the frequency component of $\Delta\phi_1(t)$;

3) applying a sinusoidal signal at the phase modulator, the carrier generated by the modulated signal is expressed as:

$$\Delta\phi_c(t) = \phi_m \cos(2\pi f_m t);$$

4) adjusting the amplitude of the sinusoidal signal, so that:

$$J_0(\phi_m) = 0,$$

an frequency component of the effective interference signal formed by feedback device 2 distributes at the side-band of the fundamental frequency and multiple frequency carrier frequency $f_m$, frequency components are not in the vicinity of zero frequency, effective interference signal P is expressed as:

$$P = 0 + p_1\cos(\phi_0 + \Delta\phi_1(t))[2J_2(\phi_m)\cos(4\pi f_m t) + \ldots] +$$
$$p_1\sin(\phi_0 + \Delta\phi_1(t))[2J_1(\phi_m)\cos(2\pi f_m t) + 2J_3(\phi_m)\cos(6\pi f_m t) + \ldots]$$
$$= p_1\cos[\phi_0 + \Delta\phi_1(t) + \phi_m\cos(2\pi f_m t)]$$

At this time, only interfering signal $P_B$ formed by backscattered/backreflected light's interference is in the vicinity of zero frequency;

5) high-pass filtering $P_{alt}$ to filter out the interference signal $P_B$ and remain effective signal P, separating interference signal with effective signal to get effective signal; and 6) using effective signal P to further reconstruct signal $\Delta\phi(t)$:

$$\Delta\phi(t) = \Delta\phi_1(t) + \phi_m \cos(2\pi f_m t)$$

Advantage of the present invention is that it can effectively eliminate the impact of backscattered (reflected) light in single core optical fiber sensing light path, the useful information is extracted from the signal of serious disturbances, which significantly improves the measurement of distance, enhance adaptability to the line of interference measurement system. The technology uses a unique carrier signal loading and demodulating method, no need to provided a reference signal homologous with carry signal at signal demodulation side like the conventional PGC demodulation method. Therefore, in the long-distance monitoring, easier to monitor end of the cable extending freely. Meanwhile, the technology requires no reference signal, structure of this method is simple and easier to implement.

Distributed optical fiber line monitoring system of the invention can be widely used in long distance monitoring of safety monitoring in the field of telecommunications lines, power transmission lines, gas pipelines, oil pipelines, border; also be used for safety monitoring of large buildings such as dams, tunnels, mines, etc.

REFERENCE NUMERAL

1: end of the sensing optical fiber 6, 2: feedback device, 3: for the N*M (N, M are integers) coupler, 4: P*Q (P, Q are integers) coupler, 5: optical fiber delayer, delay τ, 6: sensor optical fiber (optical cable) and feedback device 2 constituted, 3a1, 3a2, ..., 3aN, 3b1, 3b2: port of coupler 3, 3a1, 3a2, ..., 3aN: co-rotating ports with a total of N, 3b1, 3b2: two ports in another group co-rotating ports (with a total of M) of coupler 3. 4a1, 4a2, 4b1: ports of coupler 4, 4a1, 4a2:

two ports in a group co-rotating ports (with a total of P) of coupler 4, 4b1: two ports in another group co-rotating ports (with a total of Q) of coupler 4. 7, 8: scattering point in optical fiber, 9: phase modulator.

EMBODIMENT

Figure 1:
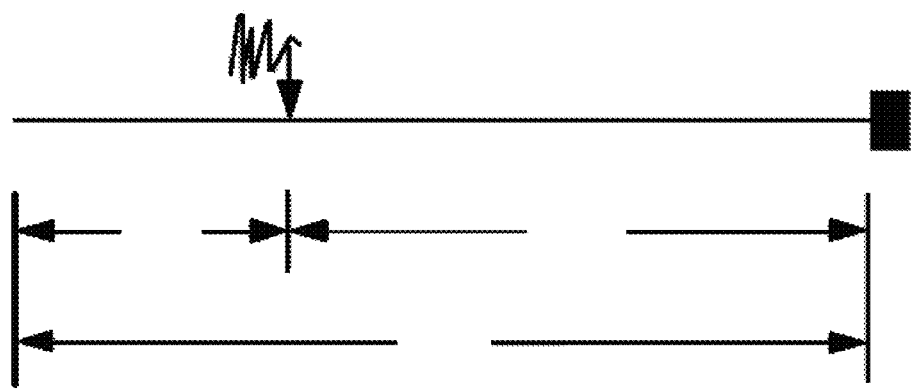
FIG. 1 is a positioning schematic diagram of single core feedback sensor.
Figure 2:
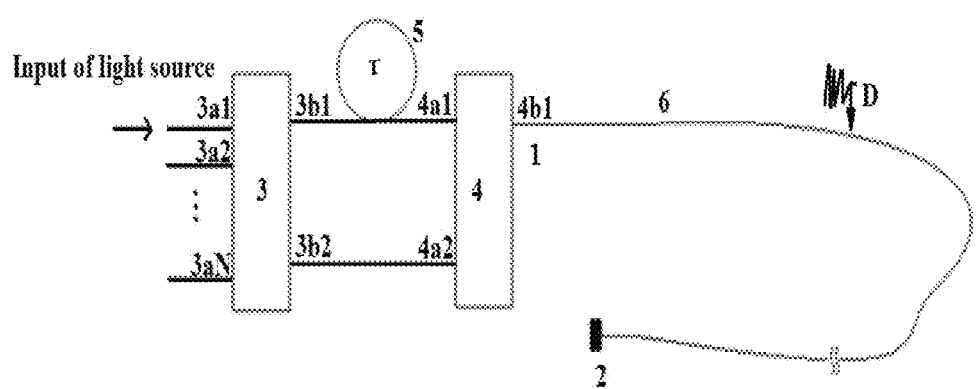
FIG. 2 is a diagram of single core feedback interference structure.
Figure 3:
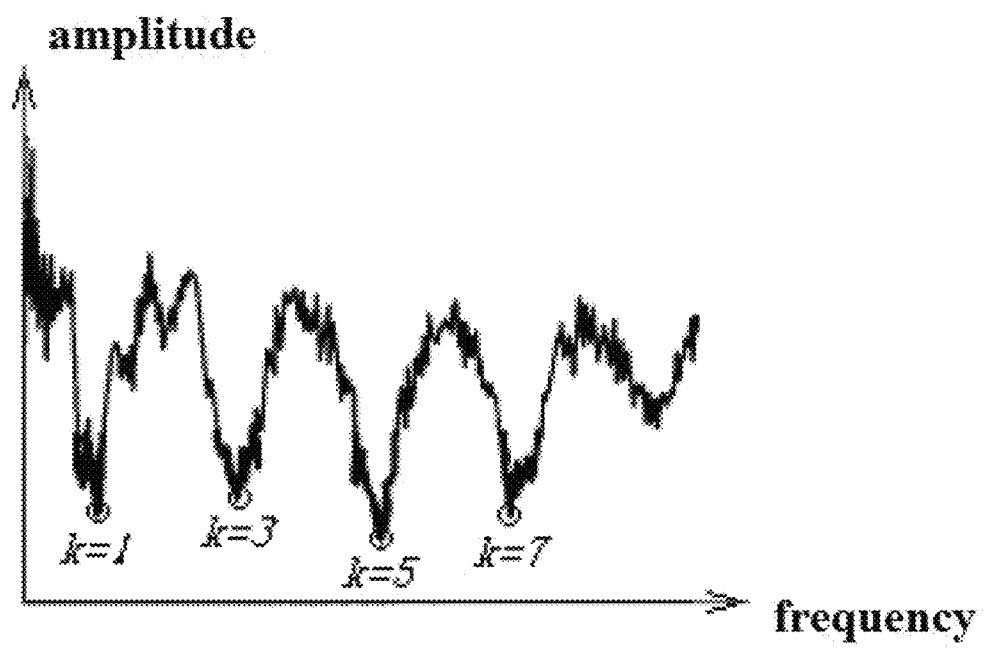
FIG. 3 is a spectrum of the phase signal demodulated from interference signal, "O" is frequency "notch point."
Figure 4:
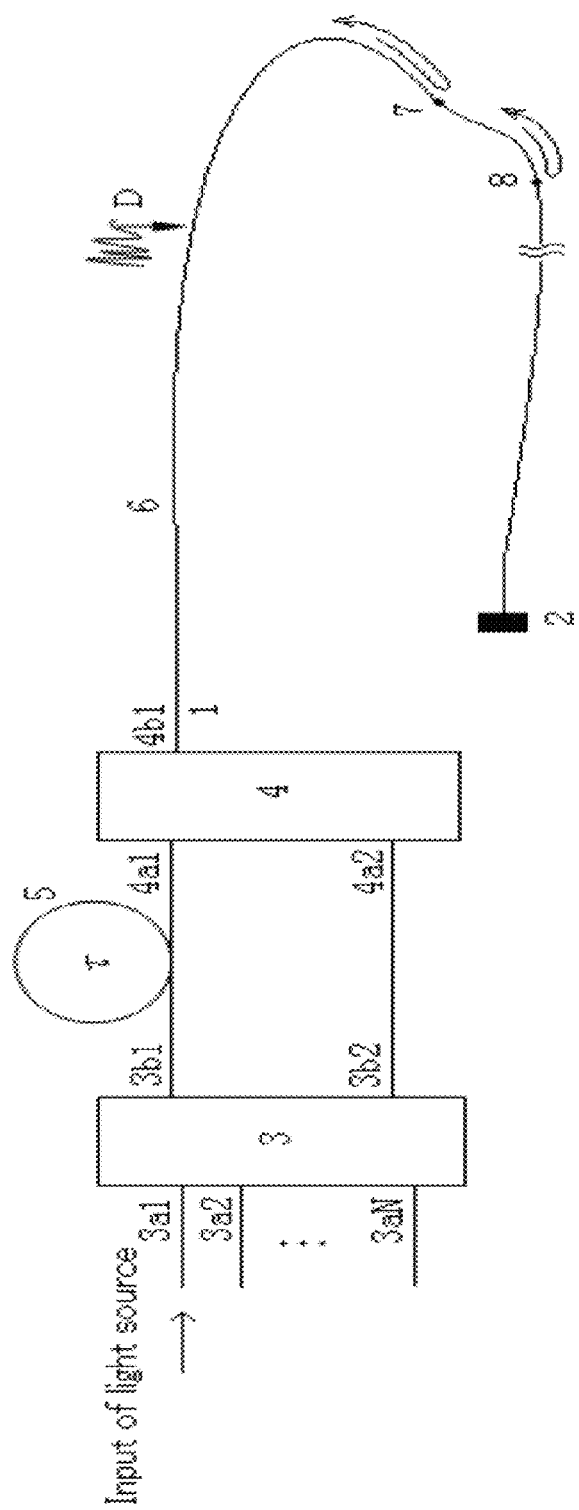
FIG. 4 is a schematic diagram of impact by backscattered light.
Figure 5:
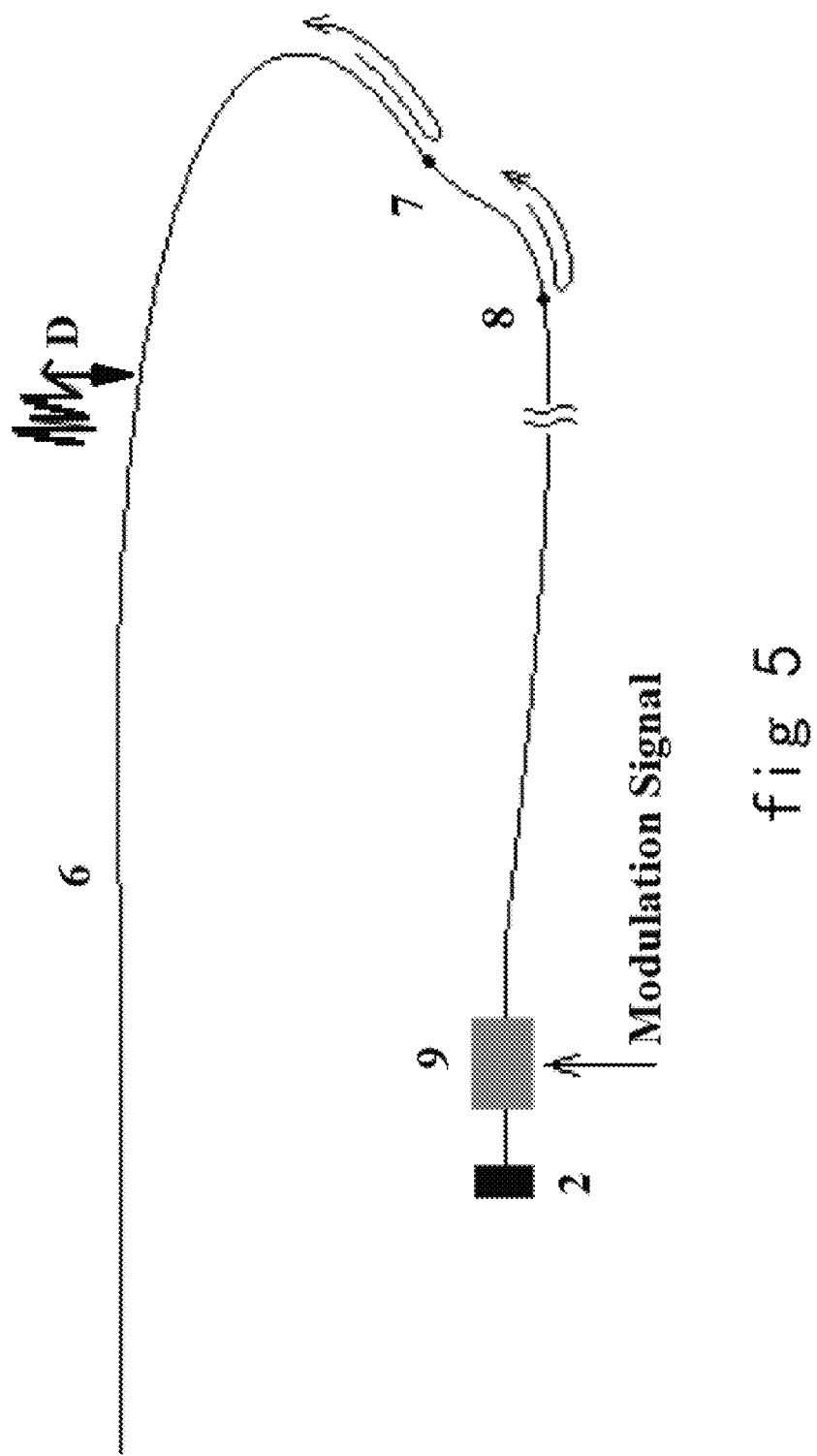
FIG. 5 is a diagram of light path connection method which use phase generated carrier technology to eliminate the impact of backscattered.

The measurement system of the embodiment use interference structure shown in FIG. 3. Length of sensing optical cable 6 is 30 km. Light source is S03-B type super super radiation diode (SLD) produced by 44 research institute of the Institute of Industrial Electronics Group Corporation, with the operating wavelength of 1310 nm. Coupler 3 uses average of 3*3 Optical Fiber tapered single mode coupler. Coupler 4 uses average of 2*2 Optical Fiber tapered single mode Coupler. Both of them are produced by Wuhan Research Institute of Posts and Telecommunications. Fiber used by fiber delayer is G652 single-mode fiber. Photoelectric converter used in photoelectric conversion and information processing is GT322C500 of InGaAs photodetector produced by 44 research institute. Feedback device 2 is produced by optical fiber end steamed aluminized production, reflectance greater than 95%. Phase modulator 9 concatenating at the tail end is produced by winding optical fiber on a piezoelectric ceramic made. Interference signal baseband bandwidth <10 kHz, frequency of sinusoidal signal loaded at phase modulator is 60 kHz.

In the single core sensing path, an active joint connection point is 10 km from end of sensing optical cable 6 (feedback device 2), at which point reflection >2 dB, disturbance applied near the port 4b1 to sensor cable 6. If do not use this The method of the invention, the system can not properly positioned. After use the modulation and demodulation method, the system can locate accurately.

Figure 6:
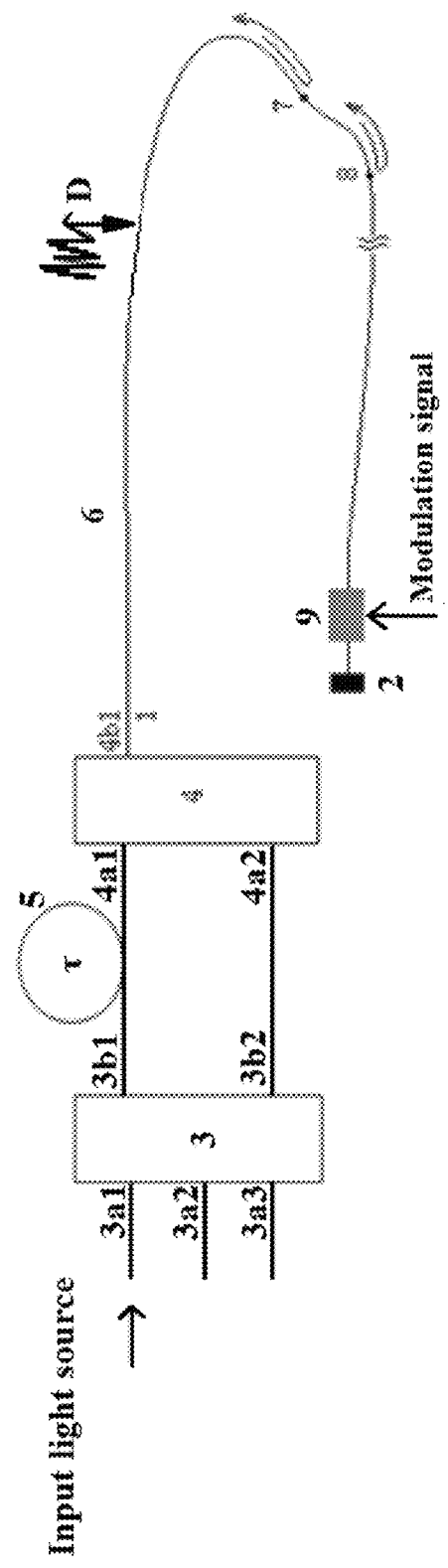
FIG. 6 is a concrete construction which the method of the present invention may be implemented.

FIG. 6 is a concrete construction which the method of the present invention may be implemented. In this configuration, the coupler 3 is coupled using average 3*3 device, light input to port 3a1, two interference signals output from two ports 3a3 and 3a2, these two interference signals can be represented as:

$$P_{3a2} = p_1 \cos\left[\frac{2\pi}{3} + \Delta\phi_1(t) + \Delta\phi_c(t)\right] + \sum_i p_{Bi}\cos[\phi_{3a2-B0i} + \Delta\phi_{B1i}(t)] \quad (16)$$

$$P_{3a3} = \quad (17)$$
$$p_1\cos\left[-\frac{2\pi}{3} + \Delta\phi_1(t) + \Delta\phi_c(t)\right] + \sum_i p_{Bi}\cos[\phi_{3a2-B0i} + \Delta\phi_{B1i}(t)]$$

Suppose the max frequency of $\Delta\phi_1(t))$ is $f_{s\phi max}$, then:

$$f_m > f_{sBmax} + f_{s1max} \text{ 且 } f_m > f_{s\phi max} \quad (18)$$

according to the method described above, the phase modulation amplitude set so as to satisfy equation (7), high-pass filter interference signal to filter out stray light caused by interference, will receive the following signals:

$$P_{3a2} = p_1\cos\left[\frac{2\pi}{3} + \Delta\phi_1(t) + \phi_m\cos(2\pi f_m t)\right] \quad (19)$$

$$P_{3a3} = p_1\cos\left[-\frac{2\pi}{3} + \Delta\phi_1(t) + \phi_m\cos(2\pi f_m t)\right] \quad (20)$$

then, use formula (19) and formula (20), signal $\Delta\phi(t)$ can be restored (Reference: Wu Hongyan, etc; fiber interference positioning system based signal demodulation technique [J]; sensors and micro systems, 2007, 26 (5): p 45-51):

$$\Delta\phi(t) = \Delta\phi_1(t) + \phi_m\cos(2\pi f_m t) \quad (16)$$

Low-pass filter $\Delta\phi(t)$, we can obtain $\Delta\phi_1(t)$.

The invention claimed is:
1. A method for reducing interference from scattered light of an interference path by generating a carrier through phase, comprising:
   (1) concatenating a phase modulator in the tail of a single core feedback sensing fiber, phase modulator introduce the interferometer phase difference $\Delta\phi_c(t)$, after reaching feedback means through the phase modulator, the light reflect to an optical cable and occurs interference signal, the signal is expressed as:

$$P = p_1 \cos[\phi_0 + \Delta\phi_1(t) + \Delta\phi_1(t)]$$

wherein, $p_1$ is a constant coefficient related to system parameters, $\phi_0$ is an initial phase of an interference structure and a constant, $\Delta\phi_1(t)$ is an interference phase difference caused by disturbance;
   as to the back scattered light caused by a previous path in the phase modulator in an optical fable, changes in the phase are not affected by the signal applied to the phase modulator, part of the optical interference signal is expressed as:

$$P_B = \sum_i p_{Bi}\cos[\phi_{B0i} + \Delta\phi_{B1i}(t)]$$

wherein, $p_{Bi}$ is an interference coefficient caused by an i-th scattering point of an optical fiber, $\phi_{B0i}$ is an initial phase corresponding to the i-th scattering point, $\Delta\phi_{B1i}(t)$ is an interference phase difference corresponding to the i-th scattering point and caused by disturbance, $$\sum_i \cdot$$

represented the sum of all the scattered points along a previous induction fiber of phase modulator;
   thus, the total output signal change portion indicates as follows:

$$P_{alt} = P + P_B$$

$J_n$ order Bessel function expansion of the signal is expression is expressed as:

$$P = p_1\cos[\phi_0 + \Delta\phi_1(t) + \phi_m\cos(2\pi f_m t)]$$
   $$= p_1\cos(\phi_0 + \Delta\phi_1(t))[J_0(\phi_m) + 2J_2(\phi_m)\cos(4\pi f_m t) + \ldots] +$$
   $$p_1\sin(\phi_0 + \Delta\phi_1(t))[2J_1(\phi_m)\cos(2\pi f_m t) + 2J_3(\phi_m)\cos(6\pi f_m t) + \ldots]$$

and $$P_{alt} = P + P_B$$
   $$= P_B + p_1\cos(\phi_0 + \Delta\phi_1(t))[J_0(\phi_m) + 2J_2(\phi_m)\cos(4\pi f_m t) + \ldots] +$$
   $$p_1\sin(\phi_0 + \Delta\phi_1(t))[2J_1(\phi_m)\cos(2\pi f_m t) + 2J_3(\phi_m)\cos(6\pi f_m t) + \ldots]$$
   $$= [P_B + p_1\cos(\phi_0 + \Delta\phi_1(t)) \cdot J_0(\phi_m)] +$$
   $$p_1\cos(\phi_0 + \Delta\phi_1(t))[2J_2(\phi_m)\cos(4\pi f_m t) + \ldots] +$$
   $$p_1\sin(\phi_0 + \Delta\phi_1(t))[2J_1(\phi_m)\cos(2\pi f_m t) + 2J_3(\phi_m)\cos(6\pi f_m t) + \ldots]$$

(2) Selecting signal frequency $f_m$ loaded in phase modulator, $f_m$ satisfy the following conditions:
$f_m > f_{sBmax} + f_{s1max}$, and $f_m$ is located out of the frequency component of $\Delta\phi_1(t)$;
$f_{s1max}$ is a maximum frequency of $\sin(\phi_{01}+\Delta\phi_1(t))$ or $\cos(\phi_{01}+\Delta\phi_1(t))$,
$f_{sBmax}$ is a maximum frequency of $P_B$;
(3) applying a sinusoidal signal at the phase modulator, the carrier generated by the modulated signal is expressed as:

$$\Delta\phi_c(t)=\phi_m \cos(2\pi f_m t),$$

$\phi_m$ is the amplitude of $\Delta\phi_c(t)$;
(4) adjusting the amplitude of the sinusoidal signal, so that:

$$J_0(\phi_m)=0,$$

an frequency component of the effective interference signal formed by feedback means distributes at the sideband of the fundamental frequency and multiple frequency carrier frequency $f_m$, frequency components are not in the vicinity of zero frequency, effective interference signal P is expressed as:

$$P = 0 + p_1\cos(\phi_0 + \Delta\phi_1(t))[2J_2(\phi_m)\cos(4\pi f_m t) + \ldots] +$$
$$p_1\sin(\phi_0 + \Delta\phi_1(t))[2J_1(\phi_m)\cos(2\pi f_m t) + 2J_3(\phi_m)\cos(6\pi f_m t) + \ldots]$$
$$= p_1\cos[\phi_0 + \Delta\phi_1(t) + \phi_m\cos(2\pi f_m t)]$$

At this time, only interfering signal $P_B$ formed by backscattered light's interference is in the vicinity of zero frequency;
(5) high-pass filtering $P_{alt}$ to filter out the interference signal $P_B$ and remain effective signal P, separating interference signal with effective signal to get effective signal.

2. The method according to claim 1, wherein, using effective signal P to further reconstruct signal $\Delta\phi(t)$:

$$\Delta\phi(t)=\Delta\phi_1(t)+\phi_m \cos(2\pi f_m t)$$

filtering $\Delta\phi(t)$ to filter out $\phi_m \cos(2\pi f_m t)$ to obtain an interference phase difference signal $\Delta\phi_1(t)$ caused by the disturbance.

3. The method according to claim 1, wherein the interference structure provided with two interference output ports, the two-way interference signals are expressed as:

$$P_{3a2} = p_1\cos[\phi_{11} + \Delta\phi_1(t) + \Delta\phi_c(t)] + \sum_i p_{Bi}\cos[\phi_{3a2-B0i} + \Delta\phi_{B1i}(t)]$$

$$P_{3a3} = p_1\cos[\phi_{12} + \Delta\phi_1(t) + \Delta\phi_c(t)] + \sum_i p_{Bi}\cos[\phi_{3a3-B0i} + \Delta\phi_{B1i}(t)]$$

and $\phi_{11}-\phi_{12} \neq n\pi$, n; is an integer
obtaining two signals having a fixed phase difference:

$$P_{3a2}=p_1 \cos[\phi_{11}+\Delta\phi_1(t)+\phi_m \cos(2\pi f_m t)]$$

$$P_{3a3}=p_1 \cos[\phi_{12}+\Delta\phi_1(t)+\phi_m \cos(2\pi f_m t)]$$

combining the two signals to recover the signal $\Delta\phi(t)=\Delta\phi_1(t)+\phi_m \cos(2\pi f_m t)$.

4. The method according to claim 1, wherein, the signal frequency on the loading phase modulator $f_m > f_{s\phi max}$, low-pass filtering the signal $\Delta\phi(t)=\Delta\phi_1(t)+\phi_m \cos(2\pi f_m t)$ to filter out frequency components of $f_m$ to obtain an interference phase difference signal caused by the disturbance.

5. A method for reducing interference from scattered light of an interference path by generating carrier through phase, comprising:
concatenating phase modulator in the tail of a single core feedback sensing fiber;
selecting sinusoidal modulating signal frequency loaded in phase modulator, so that a change portion of a total output signal includes an interference signal and an effective interference signal, wherein a spectrum of the interference signal and a spectrum of the effective interference signal do not overlap, and a frequency of the sinusoidal modulation signal is located outside a frequency component of interference phase difference caused by a disturbance;
applying the sinusoidal modulation signal to the phase modulator to generate a carrier;
adjusting an amplitude of the carrier so that a value of a $J_0$ order Bessel function at the amplitude is equal to zero; and
high-pass filtering the change portion of the total output signal, the high-pass filtering filters out the interference signal and remain the effective interference signal.

6. A method according to claim 5, further comprising:
reconstructing the remained effective interference signal to obtain a reconstruction signal, and
removing the frequency component of the sinusoidal modulation signal from the reduction signal to obtain an interference phase difference signal caused by the disturbance.

7. A method according to claim 6, further comprising a multi-path interference signal output from a plurality of output ports are joined to reconstruct the phase.

8. A method according to claim 6, further comprising Low-pass filtering the reconstruction signal to filter out the frequency component of the sinusoidal modulation signal.

9. A method according to claim 7, wherein,
two-path interference signals output from two output ports are joined to reconstruct the phase.

10. A method for reducing interference from scattered light of interference path by generating carrier through phase, comprising:
1) concatenating a phase modulator (9) in the tail of a single core feedback sensing fiber;
2) Selecting signal frequency $f_m$ loaded in phase modulator (9), $f_m$ satisfy the following conditions:
$f_m > f_{sBmax} + f_{s1max}$, and $f_m$ is located out of the frequency component of $\Delta\phi_1(t)$;
3) applying a sinusoidal signal at the phase modulator, the carrier generated by the modulated signal is expressed as:

$$\Delta\phi_c(t)=\phi_m \cos(2\pi f_m t);$$

4) adjusting the amplitude of the sinusoidal signal, so that:

$$J_0(\phi_m)=0,$$

an frequency component of the effective interference signal formed by feedback device (2) distributes at the sideband of the fundamental frequency and multiple frequency carrier frequency $f_m$, frequency components are not in the vicinity of zero frequency, effective interference signal P is expressed as:

$$P = 0 + p_1\cos(\phi_0 + \Delta\phi_1(t))[2J_2(\phi_m)\cos(4\pi f_m t) + \ldots] +$$
$$p_1\sin(\phi_0 + \Delta\phi_1(t))[2J_1(\phi_m)\cos(2\pi f_m t) + 2J_3(\phi_m)\cos(6\pi f_m t) + \ldots]$$
$$= p_1\cos[\phi_0 + \Delta\phi_1(t) + \phi_m\cos(2\pi f_m t)]$$

At this time, only interfering signal $P_B$ formed by backscattered/backreflected light's interference is in the vicinity of zero frequency;

5) high-pass filtering $P_{alt}$ to filter out the interference signal $P_B$ and remain effective signal P, separating interference signal with effective signal to get effective signal; and 6) using effective signal P to further reconstruct signal $\Delta\phi(t)$:

$$\Delta\phi(t) = \Delta\phi_1(t) + \phi_m\cos(2\pi f_m t)$$

filtering $\Delta\phi(t)$ to filter out $\phi_m\cos(2\pi f_m t)$ to obtain an interference phase difference signal $\Delta\phi_1(t)$ caused by a disturbance.

\* \* \* \* \*